(12) United States Patent
Faibish et al.

(10) Patent No.: US 7,676,587 B2
(45) Date of Patent: Mar. 9, 2010

(54) DISTRIBUTED IP TRUNKING AND SERVER CLUSTERING FOR SHARING OF AN IP SERVER ADDRESS AMONG IP SERVERS

(75) Inventors: Sorin Faibish, Newton, MA (US);
Xiaoye Jiang, Shrewsbury, MA (US);
Dennis Ting, Groton, MA (US);
Yehoshoua Sasson, Newton, MA (US);
Arthur O. Harris, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1484 days.

(21) Appl. No.: 11/011,345

(22) Filed: Dec. 14, 2004

(65) Prior Publication Data

US 2006/0129695 A1    Jun. 15, 2006

(51) Int. Cl.
*G06F 15/13* (2006.01)
(52) U.S. Cl. ..................... 709/230; 709/219; 709/226; 709/227; 709/231; 711/150; 711/151
(58) Field of Classification Search ................ 709/219, 709/226, 227, 230, 231; 711/150, 151
See application file for complete search history.

(56) References Cited

U.S. PATENT DOCUMENTS

| | | | | |
|---|---|---|---|---|
| 5,893,140 | A | 4/1999 | Vahalia et al. | 711/118 |
| 5,987,621 | A | 11/1999 | Duso et al. | 714/4 |
| 6,195,703 | B1 | 2/2001 | Blumenau et al. | 709/238 |
| 6,195,706 | B1 | 2/2001 | Scott | 709/245 |
| 6,324,581 | B1 | 11/2001 | Xu et al. | 709/229 |
| 6,360,276 | B1 | 3/2002 | Scott | 709/245 |
| 6,421,711 | B1 | 7/2002 | Blumenau et al. | 709/213 |
| 6,470,389 | B1 * | 10/2002 | Chung et al. | 709/227 |
| 6,574,667 | B1 | 6/2003 | Blumenau et al. | 709/229 |
| 6,625,750 | B1 | 9/2003 | Duso et al. | 714/11 |
| 6,665,304 | B2 * | 12/2003 | Beck et al. | 370/401 |
| 6,678,788 | B1 | 1/2004 | O'Connell | 711/114 |

(Continued)

OTHER PUBLICATIONS

David C. Plummer, "An Ethernet Address Resolution Protocol—or—Converting Network Protocol Addresses to 48 bit Ethernet Address for Transmission on Ethernet Hardware," Request For Comments: 826, Network Working Group, Nov. 1982 (9 pages).

(Continued)

*Primary Examiner*—Jinsong Hu
(74) *Attorney, Agent, or Firm*—Richard Auchterlonie; Novak Druce & Quigg, LLP

(57) ABSTRACT

Network servers in a cluster share the same network protocol address for incoming client requests, and in a data link layer protocol a reply of a client to a request from a server is returned to this same server. For example: (1) ports of the servers are clustered into one single network channel used for incoming and outgoing requests to and from the servers; or (2) ports of the servers are clustered into one single network channel used for incoming requests to the servers and a separate port of each of the servers is used for outgoing requests from each of the servers; or (3) logical ports of the servers are clustered into one network channel used for requests to the servers and a separate logical port of each of the servers is used for outgoing requests from each of the servers.

29 Claims, 7 Drawing Sheets

U.S. PATENT DOCUMENTS

| | | | | |
|---|---|---|---|---|
| 6,691,209 | B1 | 2/2004 | O'Connell | 711/114 |
| 6,718,481 | B1 | 4/2004 | Fair | 714/4 |
| 7,155,515 | B1* | 12/2006 | Brown et al. | 709/226 |
| 2002/0194499 | A1* | 12/2002 | Audebert et al. | 713/201 |
| 2005/0144463 | A1* | 6/2005 | Rossebo et al. | 713/185 |

OTHER PUBLICATIONS

Yegappan Lakshmanan, "ARP: Questions and Answers," Geocities.com, Oct. 20, 1999 (6 pages).

Yegappan Lakshmanan, "Reverse Address Resolution Protocol (RARP): Questions and Answers," Geocities.com, Oct. 20, 1999 (6 pages).

"Enhanced DNS: Strengthen your e-business infostructure with EdgeSuite Enhanced Domain Name System (DNS) solution," Akami.com, 2004 (enhanced_dns.html one page, edns_how_it_works.html one page, edge_how_it_works.html two pages).

* cited by examiner

DISTRIBUTED IP TRUNKING AND SERVER CLUSTERING FOR SHARING OF AN IP SERVER ADDRESS AMONG IP SERVERS

FIELD OF THE INVENTION

The present invention relates generally to data networks and the clustering of servers in a local area network so that the servers share a common network protocol address and requests from network clients are distributed among the servers.

BACKGROUND OF THE INVENTION

In an IP network, requests from different network clients may specify the same target IP address for a particular kind of service, and the requests may be routed by a switch to different servers in the network. For example, the service is read-only access to a web page, and the IP address is the logical address of the web site. The clustering of multiple servers in this fashion facilitates the addition of more servers to the network as needed to service an increasing number of clients.

SUMMARY OF THE INVENTION

It has been discovered that in a network file server having a cluster of data mover computers that share a target network protocol address for providing client access to files in network data storage, it may be desirable for each of the data movers to use a data link layer protocol for sending requests to and receiving replies from the network clients. For example, in an IP network, it may be desirable for a data mover to broadcast an Address Resolution Protocol (ARP) request to the network clients in order for the data mover to send its Ethernet address to a particular one of the clients or to receive a reply containing the Ethernet address of this particular one of the clients. This permits the network file server to configure the IP data network in a fashion that is transparent to the client application programs. For example, the network file server can configure the IP data network for load balancing of file access requests from the clients upon the data movers. Because the data movers share a target IP address for incoming IP packets, however, the reply might not be received by the data mover that originated the corresponding request. To solve this problem, any reply to an outgoing request is transmitted back to the data mover that originated the corresponding request.

In accordance with one aspect, the invention provides a data processing system including a cluster of servers and a local area network interconnecting the servers for distributing client requests from network clients to the servers. The servers and the local area network are configured so that the servers share a common network protocol address for receipt of the client requests distributed by the local area network from the network clients to the servers. The servers and the local area network are also configured for transmission of a server request by any one of the servers in the cluster to the clients in accordance with a data link layer protocol, and in response to the server request, for transmission of a reply from one of the clients in accordance with the data link layer protocol through the local area network back to the same one of the servers in the cluster.

In accordance with another aspect, the invention provides a data processing system including a cluster of servers and a switch interconnecting the servers for distributing client requests from network clients to the servers. The servers and the switch are configured so that the servers share a common network protocol address for receipt of the client requests distributed by the switch from the network clients to the servers. Each of the servers has a common local area network address that is shared among network ports of the servers and that is associated with the common network protocol address for receipt of the client requests distributed by the switch from the network clients to the servers. The switch selects a particular one of the servers for receiving each client request to the servers. The servers and the switch are configured for transmission of a server request by any one of the servers in the cluster through the switch to the clients in accordance with a data link layer protocol, and in response to the server request, for transmission of a reply from one of the clients in accordance with the data link layer protocol through the switch back to the same one of the servers in the cluster.

In accordance with yet another aspect, the invention provides a data processing system including a cluster of servers and a switch interconnecting the servers for distributing client requests from network clients to the servers. The servers and the switch are configured so that the servers share a common network protocol address for receipt of the client requests distributed by the switch from the network clients to the servers. Each of the servers has a respective local area network address that is not shared among network ports of the servers and that is associated with the common network protocol address for receipt of the client requests distributed by the switch from the network clients to the servers. The servers and the switch are configured for transmission of a server request by any one of the servers in the cluster from the respective local area network address that is not shared among network ports of the servers through the switch to the clients in accordance with a data link layer protocol, and in response to the server request, for transmission of a reply from one of the clients in accordance with the data link layer protocol through the switch back to the same one of the servers in the cluster to the respective local area network address that is not shared among the network ports of the server.

In accordance with still another aspect, the present invention provides a method used in a data processing system having a cluster of servers and a local area network interconnecting the servers to network clients for distributing client requests from the network clients to the servers. The servers and the local area network are configured so that the servers share a common network protocol address for receipt of the client requests distributed by the local area network from the network clients to the servers. The method includes transmitting a server request by one of the servers in the cluster to the clients in accordance with a data link layer protocol, and in response to the server request, transmitting a reply from one of the clients in accordance with the data link layer protocol through the local area network back to the same one of the servers in the cluster.

BRIEF DESCRIPTION OF THE DRAWINGS

Additional features and advantages of the invention will be described below with reference to the drawings, in which.

Figure 1:
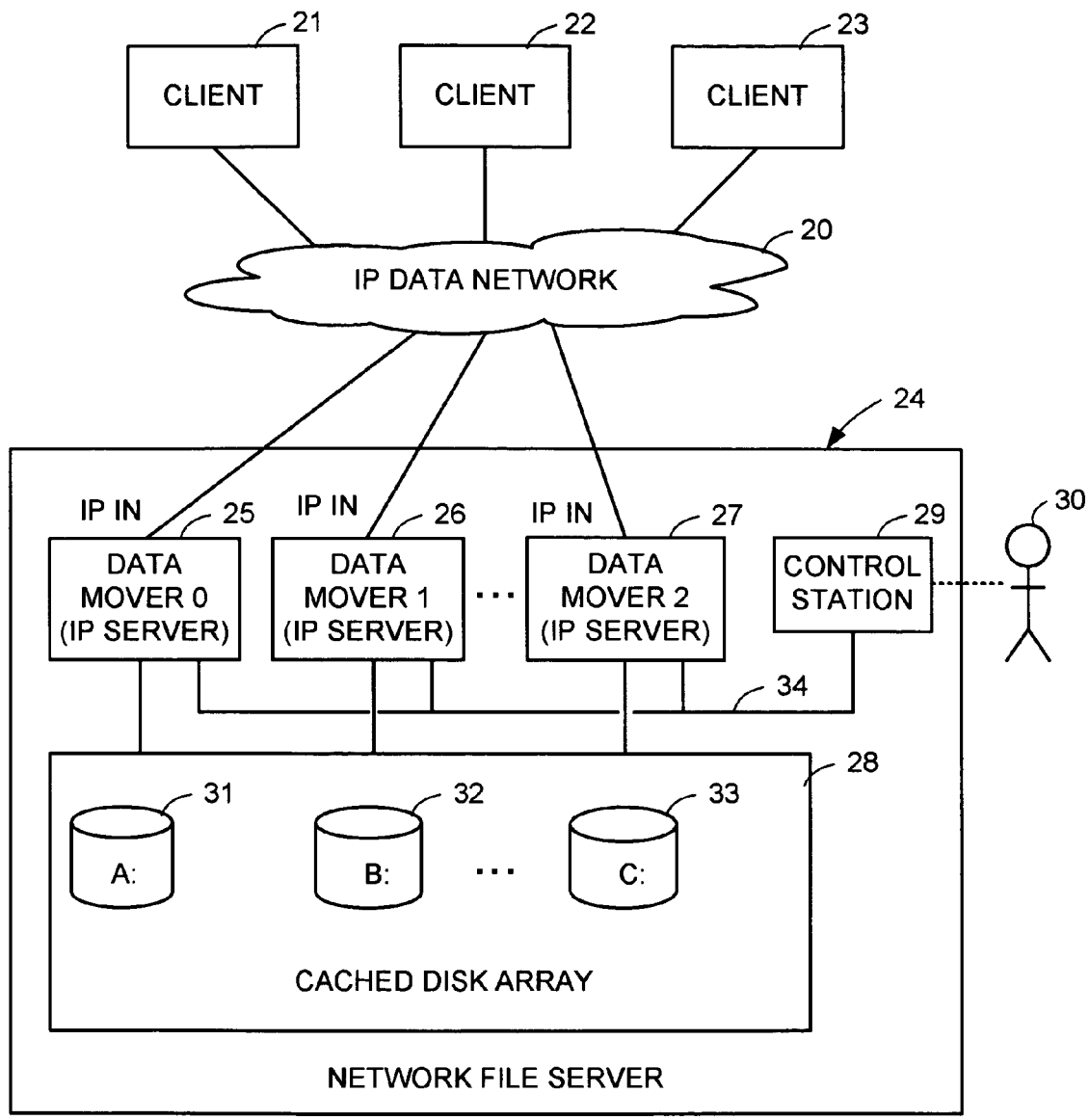
FIG. 1 is a block diagram of a data network including a network file server programmed in accordance with the present invention for servicing network clients.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes an IP data network 20 interconnecting a number of clients 21, 22, 23 to a network file server 24. The IP data network 20, for example, uses an Ethernet network connection technology and IP communication protocols such as TCP/IP. The clients 21, 22, 23, for example, are workstations such as personal computers using either UNIX or Microsoft Windows operating systems. Various aspects of the network file server 24 are further described in Vahalia et al., U.S. Pat. No. 5,893,140 issued Apr. 6, 1999, incorporated herein by reference, and Xu et al., U.S. Pat. No. 6,324,581, issued Nov. 27, 2002, incorporated herein by reference. Such a network file server is manufactured and sold by EMC Corporation, 176 South Street, Hopkinton, Mass. 01748.

The network file server 24 includes a cached disk array 28 and a number of data mover computers, for example 25, 26, 27, and more. The network file server 24 is managed as a dedicated network appliance, integrated with popular network file systems in a way, which, other than its superior performance, is transparent to the end user. The clustering of the data movers 25, 26, 27 as a front end to the cache disk array 28 provides parallelism and scalability. Each of the data movers 25, 26, 27 is a high-end commodity computer, providing the highest performance appropriate for a data mover at the lowest cost. The network file server 24 also has a control station 29 enabling a system administrator 30 to configure and control the file server. The data movers 25, 26, 27 and the control station 29 are linked together via an internal dual redundant Ethernet link 34.

In the network environment of FIG. 1, is usually desirable to permit any of the clients 22, 23 to access the same file in storage of the cached disk array 28 from any of the data movers 25, 26, 27. To ensure data consistency in this situation, a respective one of the data movers is designated as the exclusive owner of each file for the purpose of granting read-write access to the file. For example, files in the storage of the cached disk array 28 are organized into disjoint file systems such as the file system 31 named "A:" and owned by the data mover 25, the file system 32 named "B:" and owned by the data mover 26, and the file system 33 named "C:" and owned by the data mover 27. If a data mover receives a client request for read-write access to a file that the data mover does not own, then the data mover forwards the request to the data mover that owns the file. In this situation, the data mover containing the file is said to be primary with respect to the file, and the data mover having initially received the request from the client is said to be secondary with respect to the file. Protocols for file access in this situation are further described in Xu et al., U.S. Pat. No. 6,324,581 issued Nov. 27, 2001, incorporated herein by reference.

The IP data network 20 in FIG. 1 could be configured in various ways so that file access requests from the network clients are distributed among the data movers 25, 26, 27. For example, the IP data network could be configured so that only the first data mover 25 services the first client 21, only the second data mover 26 services the second client 22, and only the third data mover 27 services the third client. A very simple network configuration is required for each data mover to service a pre-assigned group of clients. Unfortunately this network configuration causes a loss of service to a group of clients when there is a failure of a data mover. Also, there is a load balancing problem for the clients such as personal workstations that place a variable workload upon the data movers. If the loading of the clients is not dynamically balanced upon the data movers, then it is often possible for one data mover to be overloaded at a time when another data mover is lightly loaded.

A preferred way of configuring the IP data network 20 is for the data movers 25, 26, 27 to share a common IP address (IP IN) and for requests from the network clients to be distributed among the data movers so that requests from any of the clients can be serviced by any one of the data movers. This has the advantage that clients 21, 22, 23 need not be concerned with the specific configuration of the network or the data movers in the network file server. Each client can simply transmit requests to the same IP address. The IP data network 20 can route the request to one of the data movers 25, 26, 27 in a fashion that is transparent to the client. If a client fails to receive a reply from the IP address, for example due to a data mover failure, the client can re-transmit the request until the request is serviced, possibly by another data mover.

In the data processing network of FIG. 1, it may be desirable for each of the data movers to use a data link layer protocol for sending requests to and receiving replies from the network clients. For example, it may be desirable for a data mover to broadcast an Address Resolution Protocol (ARP) request to the network clients in order for the data mover to send its local area network address to a particular network client or in order for the data mover to obtain the local area network address of a particular network client. The ARP protocol is defined in David C. Plummer, "An Ethernet Address Resolution Protocol—or—Converting Network Protocol Addresses to 48 bit Ethernet Address for Transmission on Ethernet Hardware," Request For Comments: 826, Network Working Group, November 1982. A data mover may send such a request in response to an indication that a client is failing to receive transmissions from the data mover. Possibly a client may fail to receive transmissions from a data mover because the data mover has failed to receive the client's correct local area network address or because the client's local area network address has changed. In this case, an ARP reply from the client may give the data mover the client's correct local area network address so that data mover will correct the client's Ethernet in the data mover's cache of client local area network addresses and send further transmissions to the client's correct local area network address.

The network layer of an IP data network is typically an Ethernet. Every physical port on the Ethernet has a unique six byte local area network address. The local area network address is a kind of hardware address and is called a "MAC" address. Each IP packet is either a broadcast packet that is processed by all physical ports that receive it, or the IP packet includes a specific destination MAC address so that the IP packet is processed only by the physical port that has the destination MAC address. The Internet Protocol uses four byte network protocol addresses known as IP addresses. A network link driver for a physical port on the Ethernet may be programmed with an IP address.

In order to use the ARP protocol, the network link driver is programmed to respond to an ARP request by comparing its programmed IP address to an IP address specified in the ARP request, and when this comparison indicates a match between the programmed IP address and the specified IP address, the network link driver returns an ARP reply including the MAC address of the physical port of network link driver. Also when such a match occurs, the network link driver obtains a source IP address and a source MAC address from the ARP request, and updates a cache of IP-MAC address mappings to associate the source MAC address with the source IP address.

Figure 2:
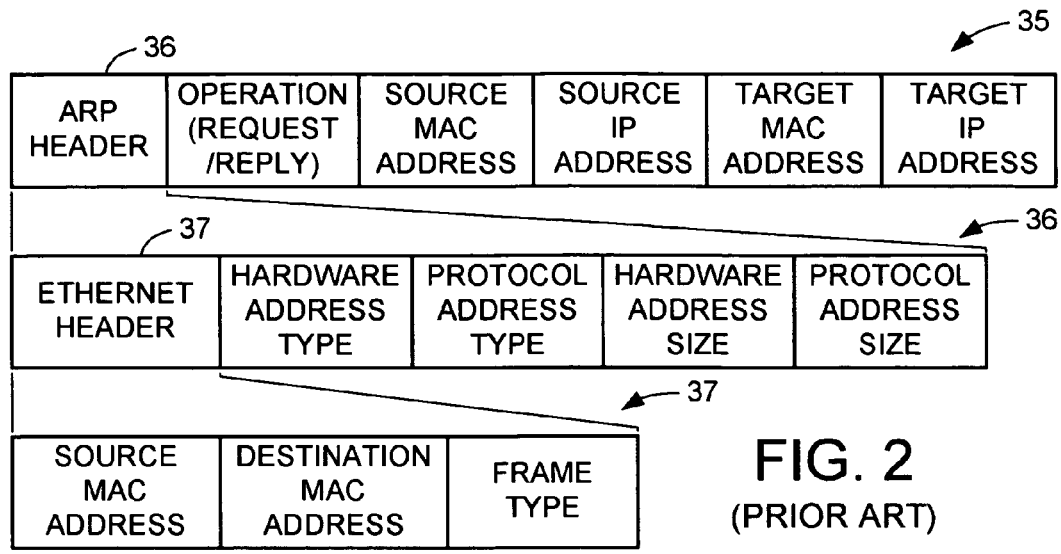
FIG. 2 shows the format of an ARP request or reply transmitted over an Ethernet.

FIG. 2 shows various fields in an ARP request or reply data packet 35. The ARP packet 35 includes an ARP header 36 followed by an operation code indicating whether the ARP packet 35 is a request or reply packet, a source MAC address, a source IP address, a target MAC address, and a target IP address.

The ARP protocol may be used for network protocols other than the IP protocol, and the ARP packets may be transmitted over other kinds of data networks, such as FDDI, token ring, and fast Ethernet networks. The ARP header 36 includes information for routing of the ARP packet 35 over a particular kind of network and information about the local area network address of the particular kind of network and the network protocol address for the particular network protocol to be used. In particular the ARP header 36 includes a header 37 for the particular kind of network, a hardware address type field specifying the type of local area network address, a protocol address type field specifying the type of network protocol address, a hardware address size field specifying the size of the local area network address, and a protocol address size field specifying the size of the network protocol address. For transmission over an Ethernet, the header 37 is an Ethernet header including the source MAC address, a destination MAC address that is the same as the target MAC address, and a frame type.

Because the data movers in FIG. 1 share a target IP address for incoming IP packets, it may be possible for a client to reply to an ARP request from a data mover and the ARP reply might not be received by this data mover. To solve this problem, any ARP reply to an outgoing ARP request from a data mover is transmitted back to the data mover that originated the ARP request.

There are at least three specific ways of configuring the system of FIG. 1 so that any ARP reply to an outgoing ARP request from a data mover is transmitted back to the data mover that originated the ARP request. For example: (1) ports of the data movers are clustered into one single Ethernet channel used for incoming and outgoing requests to and from the data movers; (2) ports of the data movers are clustered into one single Ethernet channel used for incoming requests to the data movers and a separate port of each of the data movers is used for outgoing requests from each of the data movers; and (3) logical ports of the data movers are clustered into one Ethernet channel used for incoming requests to the data movers and a separate logical port of each of the data movers is used for outgoing requests from each of the data movers.

Figure 3:
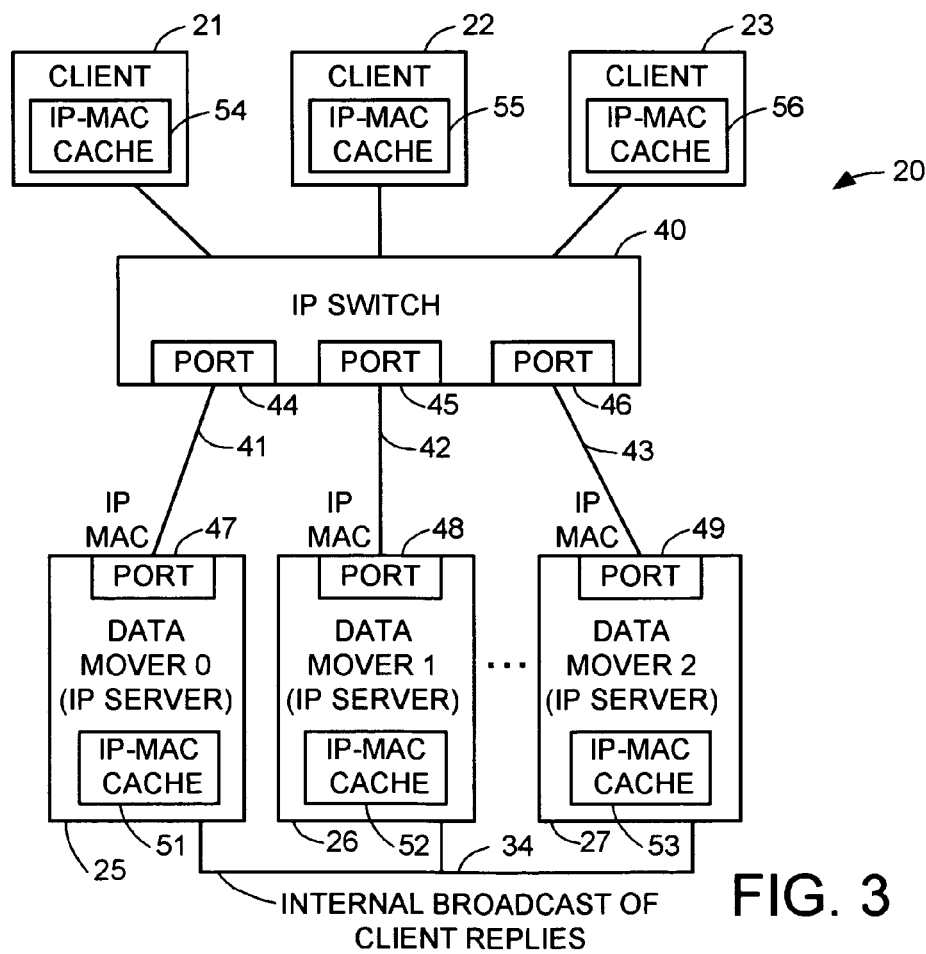
FIG. 3 shows a first configuration of the IP data network introduced in FIG. 1 in which the data movers in a cluster share the same IP and Ethernet addresses.

As shown in FIG. 3, the IP network 20 introduced in FIG. 1 has been configured to use the first technique of clustering multiple ports onto one Ethernet channel. The IP network 20 includes an IP switch 40 coupling the network clients 21, 22, 23 to the data movers 25, 26, 27. Each of the data movers functions as an IP server in a server cluster. The IP network 20 further includes, for each data mover, a respective IP link 41, 42, 43 from a respective port 44, 45, 46 of the switch 40 to a respective port 47, 48, 49 of the data mover. These data mover ports 47, 48, 49 that are linked to the IP switch 40 have the same IP address and the same MAC address. The technique of using a plurality of links from the switch to multiple ports sharing the same IP and MAC addresses is a kind of trunking.

For load balancing, the IP switch 40 may direct the IP packets from each network client 21, 22, 23 to different ones of the data movers 25, 26, 27. For example, the routing characteristics the of switch could be adjusted dynamically in response to measurement of the loading of the particular clients, and in response to blockage at data mover ports, as described in Blumenau et al. U.S. Pat. No. 6,195,703 issued Feb. 27, 2001, incorporated herein by reference, and Blumenau et al. U.S. Pat. No. 6,574,667 issued Jun. 3, 2003, incorporated herein by reference. Therefore, it is possible for a client response to an outgoing IP packet from a data mover to be to be received by another data mover.

So that a client response to an outgoing IP packet from data mover may be received by the data mover having sent the outgoing IP packet, the client response is passed among the data movers over the network 34 internal to the cluster. For example, when a data mover receives an incoming IP packet in response to an outgoing IP packet from another data mover, this incoming IP packet is broadcast over the internal network 34, received by all of the other data movers in the cluster, and processed by the data mover having sent the outgoing IP packet.

Figure 4:
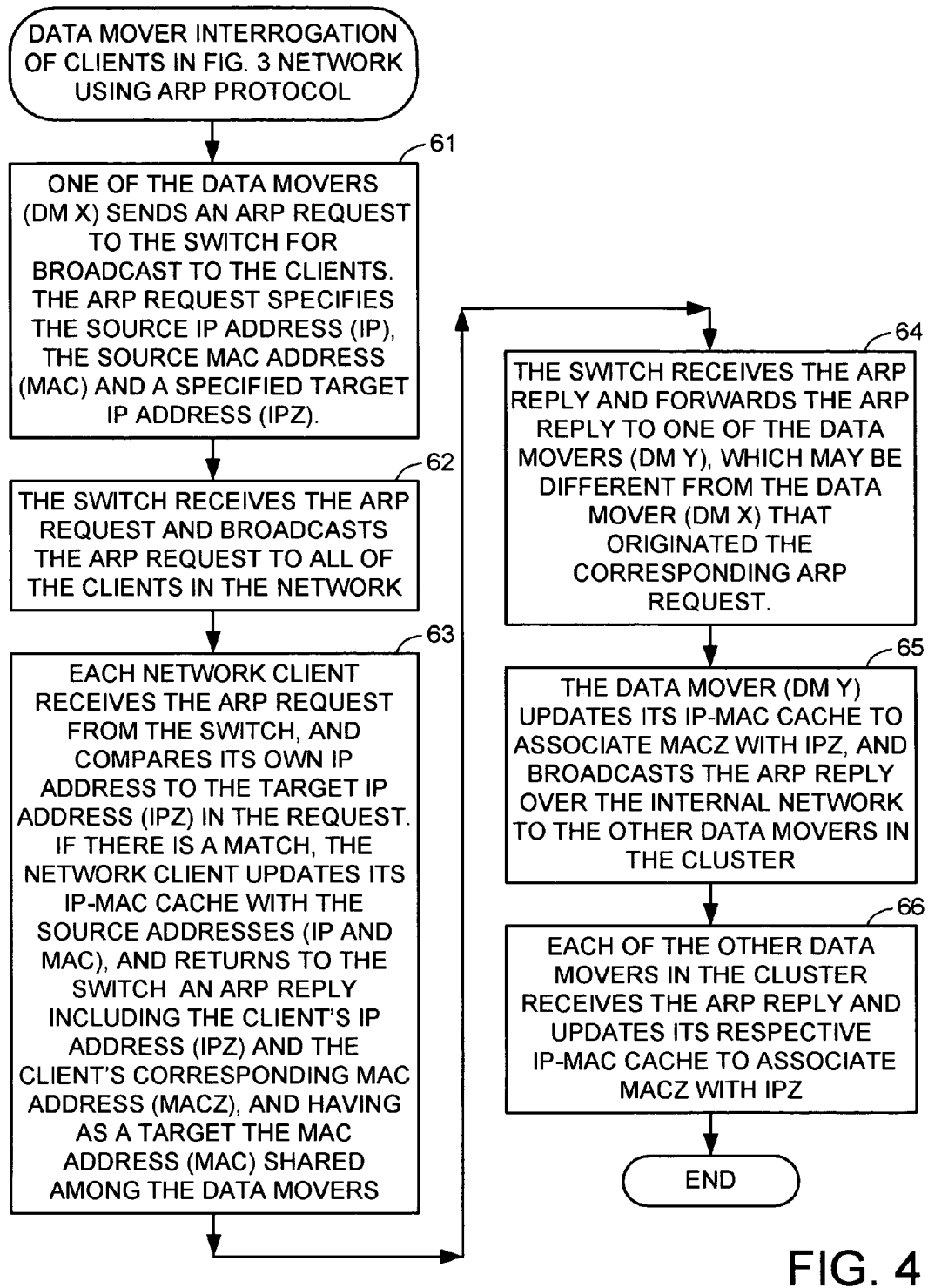
FIG. 4 is a flowchart showing how data movers in the network configuration of FIG. 3 may use the ARP protocol to obtain Ethernet addresses from the network clients.

FIG. 4 shows a specific example of how the system of FIG. 3 may handle data mover interrogation of the network clients using the ARP protocol. In a first step 61, one of the data movers (DM X) sends an ARP request to the switch for broadcast to the network clients. Then in step 62, the switch receives the ARP request and broadcasts the ARP request to all of the clients in the IP network. In step 63, each network client receives the ARP request, compares its own IP address to the IP address (IPZ) specified in the ARP request, and if there is a match, the network client returns to the switch an ARP reply including the client's IP address (IPZ) and the client's corresponding MAC address (MACZ), and having as a target the MAC address (MAC) shared among the data movers. In step 64, the switch receives the ARP reply and forwards the ARP reply to one of the data movers (DM Y), which may be different from the data mover (DM X) that originated the corresponding ARP request. In step 65, the data mover (DM Y) receiving the ARP reply updates its IP-MAC cache to associate MACZ with IPZ, and broadcasts the ARP reply over the internal network to the other data movers in the cluster. Finally, in step 66, each of the other data movers in the cluster (i.e., the data movers other than DM Y) receives the ARP reply and updates its respective IP-MAC cache to associate MACZ with IPZ.

The system configuration in FIG. 3 for routing any reply to an outgoing IP data packet back to the data mover having originated the outgoing IP data packet has the advantage that there is no need for additional complexity associated with the IP switch. The system configuration in FIG. 3, however, has the disadvantage that an internal broadcast network is used for broadcasting client replies among the data movers.

Figure 5:
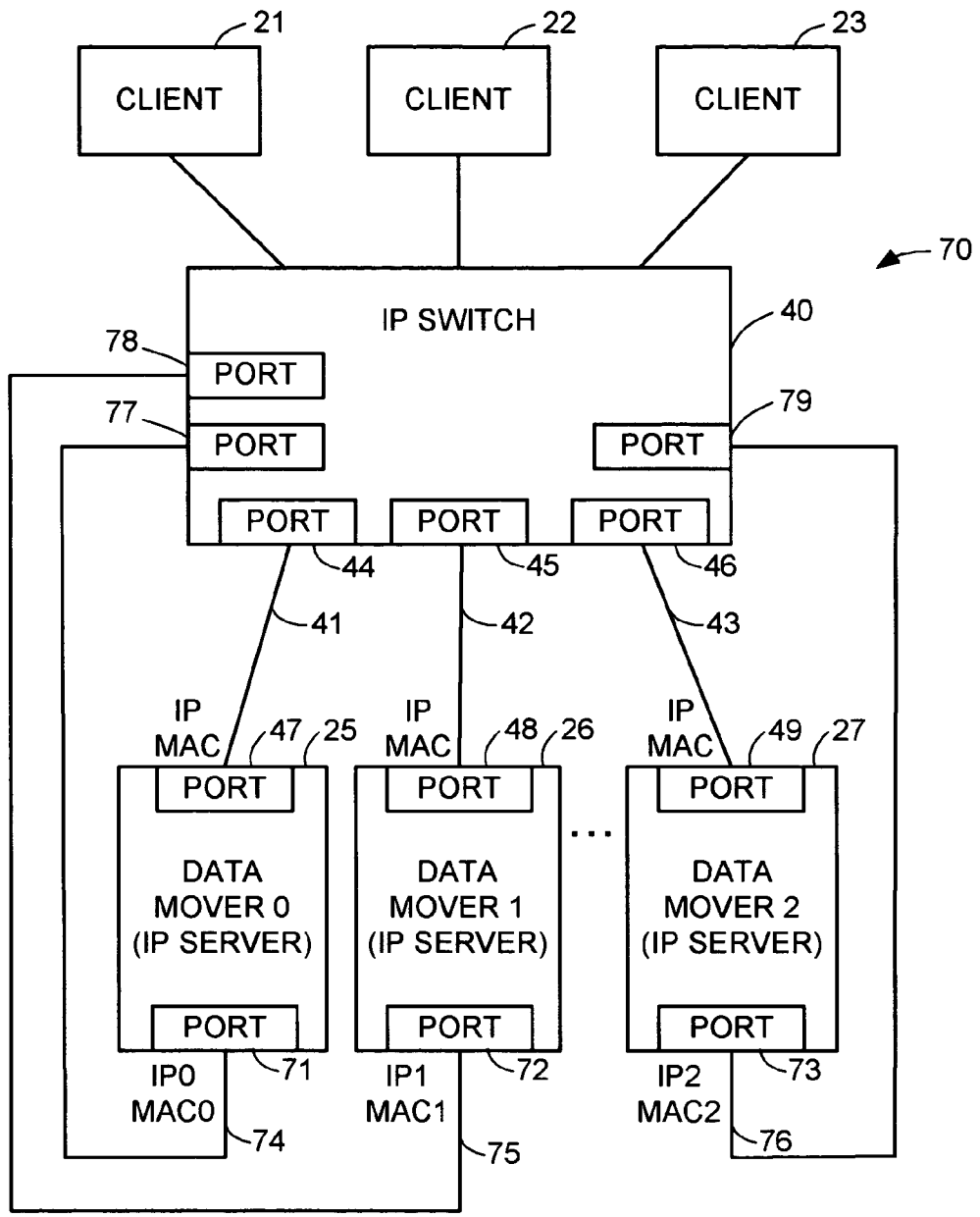
FIG. 5 shows a second configuration of the IP data network introduced in FIG. 1 in which each data mover in the cluster is provided with two physical ports, one having IP and Ethernet addresses shared with the other data movers in the cluster for receiving file access requests from the network clients, and another physical port having a unique IP address and a unique hardware address used in ARP requests to the network clients.

FIG. 5 shows a second system configuration for transmitting any reply to an outgoing IP data packet back to the data mover that originated the outgoing IP data packet. The switch 40 routes data access requests from the clients to the data movers 25, 26, and 27 in the same fashion as described above with reference to FIG. 3. In particular, for incoming requests, the data mover ports 47, 48, and 49 share a common IP address and a common MAC address.

The system of FIG. 4, however, has a different IP network 70 including a separate link from each data mover to the switch for sending requests from the data movers to the clients and for returning replies from the clients to the data movers. The data movers have respective additional physical ports 71, 72, 73 connected by respective network links 74, 75, 76 to respective additional physical ports 77, 78, 79 on the IP switch 40. Thus, all of the physical ports are on the same Ether subnet. On each data mover, one of the two physical ports is used only for receiving incoming IP packets, and the other of the two ports is used for sending outgoing IP packets and receiving replies to the outgoing IP packets. The ports 47, 48, 49 used for only receiving incoming IP packets all have the same IP address and the same MAC address. The ports 71, 72, 73 used for sending outgoing IP packets and receiving replies to the outgoing IP packets have different IP addresses (IP0, IP1, IP2) and different MAC addresses (MAC0, MAC1, MAC2).

For example, the data mover 25 can send an ARP request out its port 71 and over the link 74 to the port 77 on the IP switch 40. This ARP request includes the source MAC address (MAC0) of the IP port 71, a broadcast MAC target address, and a specified IP address (IPZ). The IP switch receives this ARP request and broadcasts this ARP request to the network clients 21, 22, 23. If one of the network clients has the specified IP address (IPZ), then it returns to the switch an ARP reply including the specified IP address (IPZ), this network client's MAC address (MACZ) associated with the specified IP address (IPZ), and a target MAC address (MAC0) that is the same as the source address for the corresponding ARP request. The IP switch 40 routes the ARP reply to the data mover port having the target MAC address (MAC0). Therefore, the IP switch 40 transmits the ARP reply from its port 77 over the link 74 back to the port 71 so that the ARP reply is returned to the data mover 25 having originated the corresponding ARP request.

The system configuration in FIG. 4 for routing any reply to an outgoing IP data packet back to the data mover having originated the outgoing IP data packet has the advantage that each data mover is provided with a unique IP address and a unique MAC address for sending requests to and receiving replies from the network clients. This simplifies the programming of the data movers. However, the system configuration in FIG. 4 has the disadvantages of additional complexity associated with the additional ports 77, 78, 79 in the switch 40 and routing logic in the switch associated with these ports.

Figure 6:
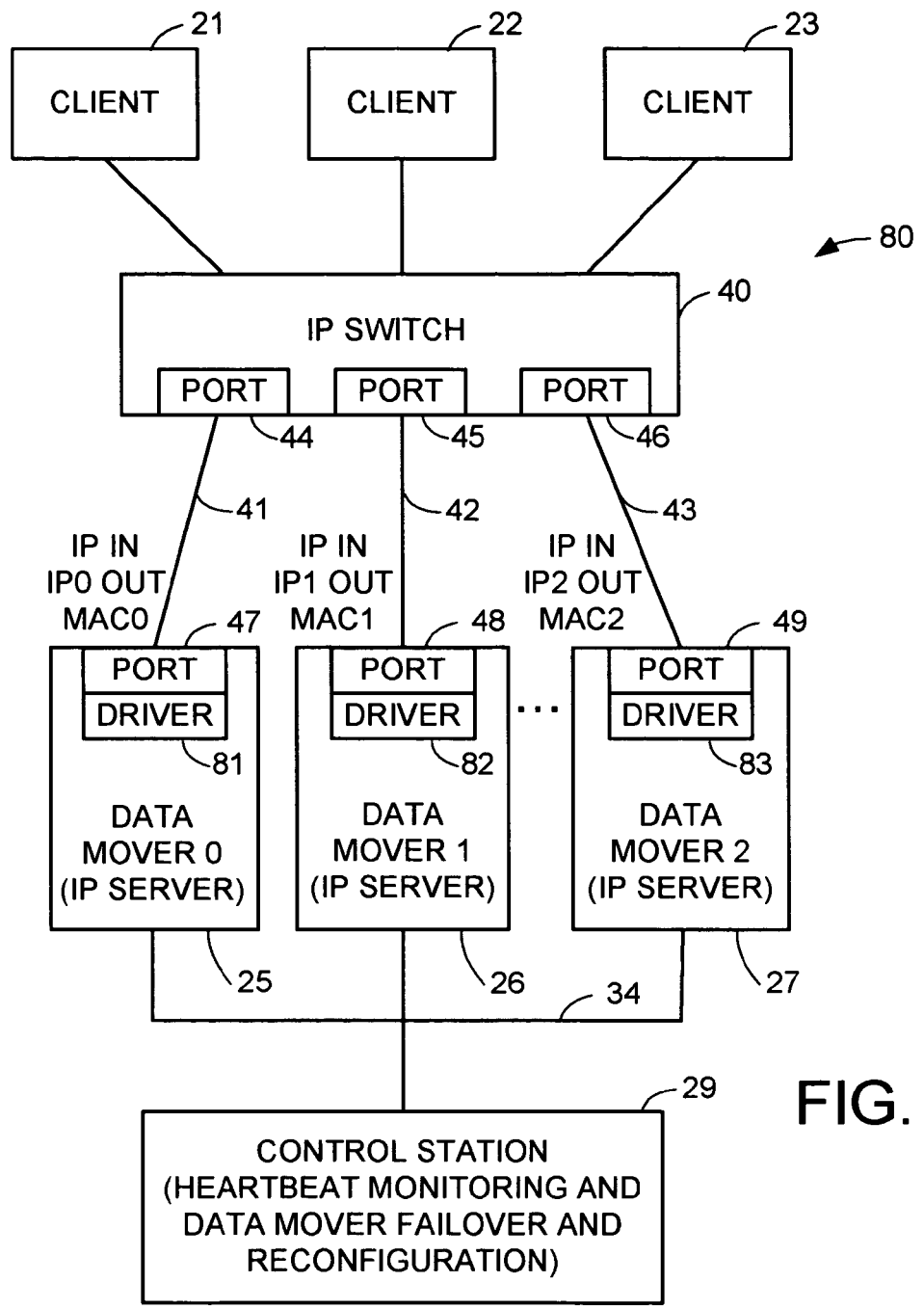
FIG. 6 shows a third configuration of the IP data network introduced in FIG. 1 in which each data mover in the cluster is provided with a physical port having a shared IP address for incoming client requests, a unique IP address for outgoing data packets, and a unique Ethernet address.

FIG. 6 shows a third system configuration for transmitting any reply to an outgoing IP data packet back to the data mover that originated the outgoing IP data packet. This third configuration is similar to the first system configuration of FIG. 3 in that it uses the IP switch 40 for coupling the network clients 21, 22, 23 to the data movers 25, 26, 27 in the cluster, and each physical port 47, 48, 49 on each data mover is connected via a respective link 41, 42, 43 to a respective physical port 44, 45, 46 on the switch. In the third system configuration, however, the respective network link drivers 81, 82, 83 of the data movers are programmed so that each of the physical ports 47, 48, 49 of the data movers has two logical IP addresses, one for incoming IP packets (in which a common IP address shared among data movers in the cluster), and one for outgoing IP packets (in which a different IP address is associated with each data mover). These physical ports on the data movers have the same logical IP address for incoming IP packets directed to the common IP address, but different MAC addresses, and different logical IP addresses for outgoing IP packets from the different IP addresses.

For the third configuration in FIG. 6, the switch 40 need not be directly involved in dynamic load balancing because the data mover ports 47, 48, 49 have unique MAC addresses. The switch 40 can simply direct an incoming IP data packet to the one data mover port having a specified target MAC address, or if the incoming IP data packet specifies a broadcast destination address, the switch broadcasts the incoming IP data packet to all of the data mover ports 47, 48, 49.

An incoming ARP request from a client to common IP address for the data mover cluster should not result in a plurality of replies with different MAC addresses. Typically an incoming ARP reply from a network client into the switch 40 would be broadcast to all of the data movers in the cluster, so in this situation only a single data mover in the cluster of FIG. 5 should reply to the ARP request, and the others should ignore the ARP request. The ARP reply includes a source IP address of "IP IN" and a source MAC address that is the MAC address (e.g., MAC0, MAC1, or MAC2) of the data mover that replies. For example, upon receipt of an ARP request sent to the shared logical IP address for incoming IP packets, each of N data movers (i=0 to N−1) in the cluster computes the modulo-N of the source IP address (src) of the incoming ARP request, and the data mover having an index i=modN(src) returns a reply to the ARP request and the other data movers do not reply. Instead of using such a programmed formula, each data mover could be programmed with a table of source IP address of the clients for which the data mover should respond. The use of a table in each data mover would permit the clients to be assigned to the data movers for balancing of the expected client loading on the data movers.

The fact that a respective one of the data movers with a unique MAC address will respond to an ARP request from a client may by default result in subsequent communication from that client being directed to the MAC address of that respective one of the data movers. Consequently, a respective disjoint group of the data movers may become serviced by each of the data movers in the cluster. This may result in dynamic load imbalances for applications having time-variant loading, unless there is frequent reprogramming of the IP to MAC address association in the IP-MAC caches of the network clients so that client requests are redirected away from the heavily loaded data movers and toward the less heavily loaded data movers. The binding of a single client or a particular group of clients to a particular data mover, however, may be useful in applications where it is efficient for a relatively long series of transactions by the clients or group of clients to be handled by the same data mover. Such efficiencies may arise, for example, due to caching of shared data in local memory of a data mover or due to complex authentication protocols among the clients in the group.

The third system configuration of FIG. 6 has the advantage that no additional network links or switch ports are needed. This third technique has the disadvantages of more complex programming for the network link drivers, and a need for high-level configuration and centralized supervision. For example, if a data mover fails, it will not respond to ARP requests, or subsequent requests, from the group of clients assigned to the data mover. Consequently, no data mover in the cluster will respond to these ARP requests until some kind of supervisory process determines that a data mover has failed, and the data movers are reconfigured for responding to these ARP requests.

Figure 7:
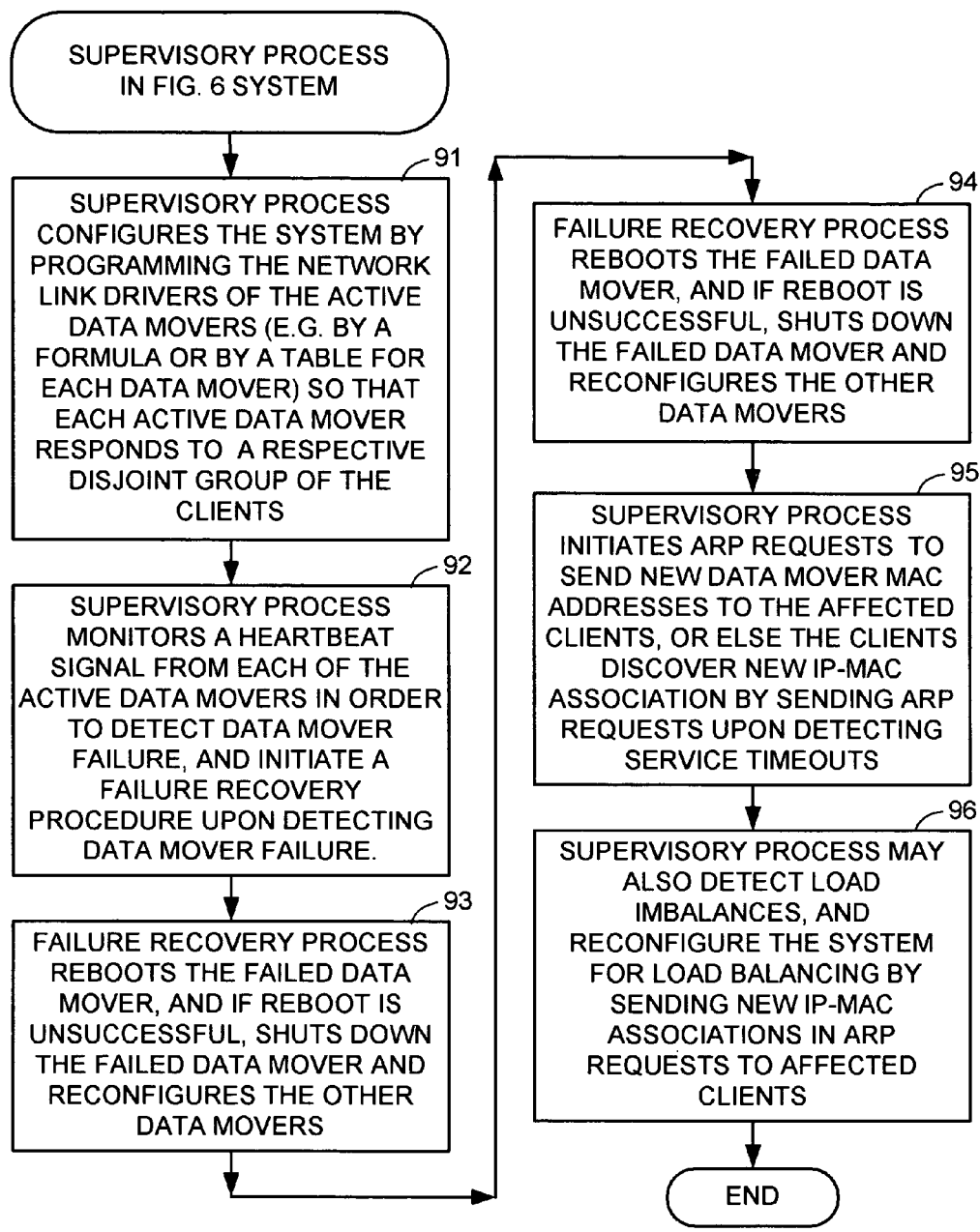
FIG. 7 is a flowchart of a supervisory process used in the system of FIG. 6 for configuration, data mover failure recovery, and load balancing.

The control station 29, for example, may detect data mover failure by monitoring periodic heartbeat signals transmitted by the data movers over the internal data network 34, and initiate a data mover failover process, as further described in Duso et al. U.S. Pat. No. 5,987,621 issued Nov. 16, 1999, incorporated herein by reference, and Duso et al. U.S. Pat. No. 6,625,750 issued Sep. 23, 2003, incorporated herein by reference. Recovery from failure of a data mover in a network server is further described in Vahalia et al. U.S. Pat. No. 6,275,953 issued Aug. 14, 2001, incorporated herein by reference Once the data mover cluster has been reconfigured as part of the failover process, when a client detects a service timeout, it may send an ARP request to the incoming IP address for the data mover cluster, and receive a new MAC address for communicating with the cluster. It is also possible for the failover process to have one or more replacement data movers send an ARP request to each client in a group clients affected by a data mover failure, so that retransmission by each client in the group could be directed to a replacement MAC address before the client detects a service timeout. Each such ARP request would include the common source IP address of "IP IN" and a source MAC address that is the replacement MAC address. For example, FIG. 7 shows a supervisory process used in the system of FIG. 6 for the configuration, data mover failure recovery, and load balancing. In step 91, the supervisory process configures the system by programming the network link drivers of the active data movers (e.g., by a formula or by a table for each data mover) so that each active data mover responds to a respective disjoint group of the clients. In step 92, the supervisory process monitors a heartbeat signal from each of the active data movers in order to detect data mover failure, and initiates a failure recovery procedure upon detecting data mover failure. In step 93, the failure recovery process reboots the failed data mover, and if reboot is unsuccessful, shuts down the failed data mover and reconfigures the other data movers. In step 94, the failure recovery process reboots the failed data mover, and if reboot is unsuccessful, shuts down the failed data mover and reconfigures the other data movers. In step 95, the supervisory process initiates ARP requests to send new data mover MAC addresses to the affected clients, or else the clients discover new IP-MAC association by sending ARP requests upon detecting service timeouts. Finally, in step 96, the supervisory process may also detect load imbalances, and reconfigure the system for load balancing by sending new IP-MAC associations in ARP requests to affected clients.

Figure 8:
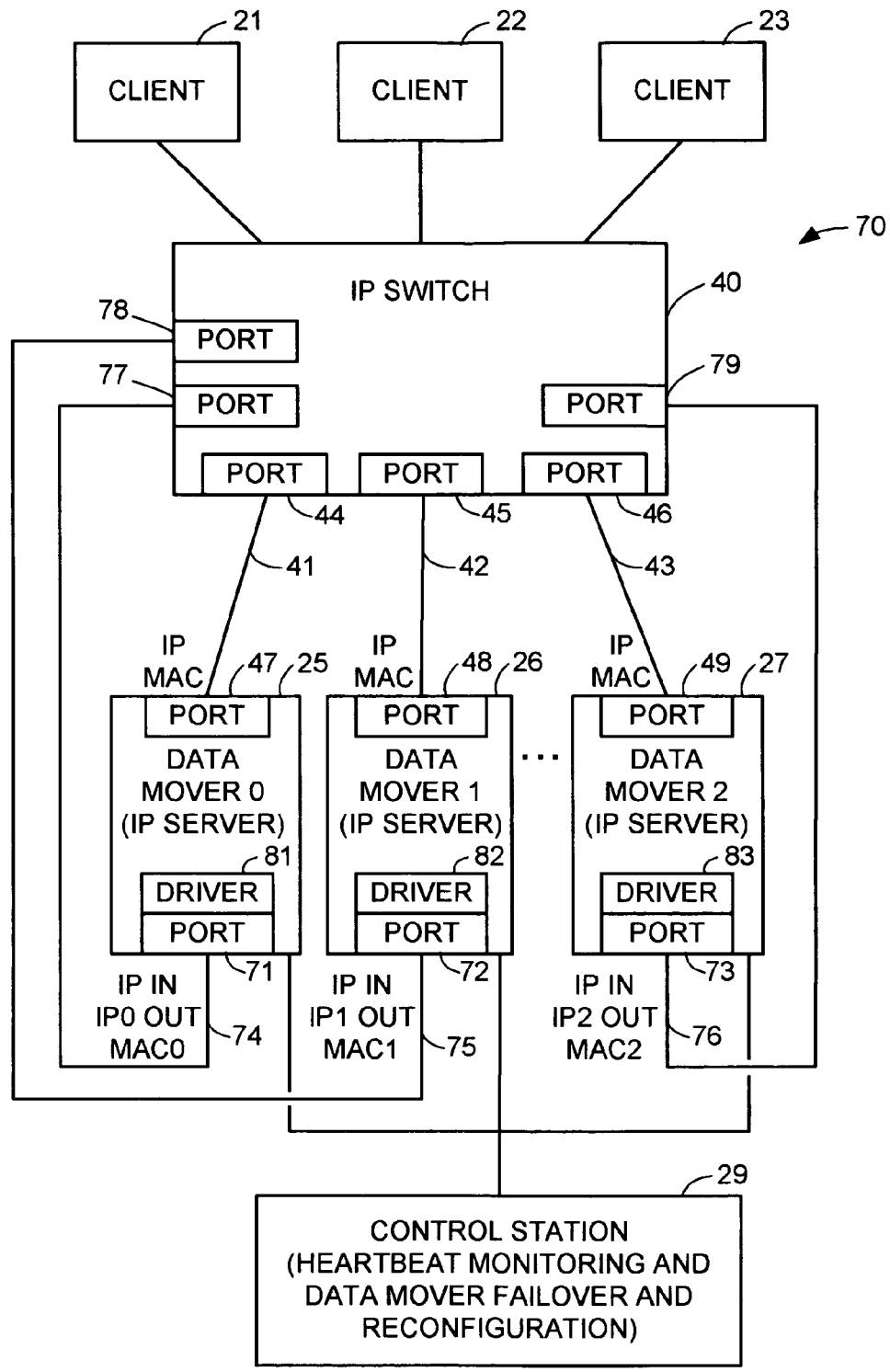
FIG. 8 shows a fourth configuration of the IP data network introduced in FIG. 1 in which features of the second and third configurations are used in combination.

The system configuration used in FIG. 6 could be combined with the system configuration used in FIG. 3 or FIG. 5 in order to provide a set of ports having a shared IP address for a relatively fixed assignment of clients to data movers as described above with respect to FIG. 6 for file access requests of a first type (such as a series of read-write transactions) and a set of ports having a shared IP address for dynamic load balancing of client file access requests of a second type (such as read-only access) as described above with respect to FIGS. 3 or FIG. 5. In this case, the dynamic load balancing of client requests of the second type can be used to compensate for unbalanced data mover loading by the fixed assignment of clients for requests of the second type. FIG. 8, for example, illustrates the combination of the system of FIG. 5 with the system of FIG. 6. The components in FIG. 8 function as described above with reference to FIGS. 5 and 6 except that the ports 71, 72, and 73 in FIG. 8 also perform the functions of ports 47, 48, and 49, respectively, that are shown in FIG. 6.

The discussion above used the ARP protocol as an example of a data link layer request-reply protocol between the clients and the data movers. The various system configurations described above, however, could use various other kinds of data link layer request-reply protocols with the same advantage that the routing of the requests and replies would be done at a low layer of programming. Thus, the handling of the data link layer request-reply protocol could be transparent to and independent of higher programming layers (such as the client applications) in order to simplify the integration and portability of the higher programming layers. In addition, the data link layer request-reply protocol could be executed by separate processors or special hardware dedicated to driving the network links in order to provide an improvement in performance.

For example, a client application could require a typical service that could be handled efficiently by access to any server followed by a series of transactions that would be most efficiently handled by the same server. The typical service could be provided by directing client requests to the common IP address shared by multiple servers in a cluster. The series of transactions could be provided by a series of data link level request-replies between the client and the same server. The fact that the various kinds of requests and replies would be routed in different ways to different network protocol addresses or different local area network addresses could be handled at the network link layer transparent to and independent of the higher layers of programming.

In view of the above, servers are clustered so that a client can communicate with any one of the servers using the same server network protocol address. This enables load balancing of client requests among the servers in a way that is transparent to the clients. The sharing of the target network protocol addresses for network data packets from the clients may cause a problem in which a reply of a client to a request from a server in accordance with a data link level protocol may not be returned to the server that originated the request. For example, if a server happens broadcast an ARP request to the clients, then a reply from a client to the server may not be received by the server having initiated the ARP request. There have been described three specific ways of solving this problem: (1) ports of the different servers are clustered into one single network channel used for incoming and outgoing requests to and from the servers; (2) ports of the different servers are clustered into one single network channel used for incoming requests to the servers and a separate port of each of the servers is used for outgoing requests from each of the servers; and (3) logical ports of the different servers are clustered into one network channel used for incoming requests to the servers and a separate logical port of each of the servers is used for outgoing requests from each of the servers.

What is claimed is:

1. A data processing system comprising a cluster of servers and a local area network interconnecting the servers for distributing client requests from network clients to the servers, wherein the servers are programmed for producing replies to the client requests, the local area network is configured for returning the replies to the client requests from the servers to the network clients, and the servers and the local area network are configured so that the servers share a common network protocol address for receipt of the client requests distributed by the local area network from the network clients to the servers, and wherein the servers and the local area network are configured for transmission of a server request by any one of the servers in the cluster to the clients in accordance with a data link layer protocol, and in response to the server request, for transmission of a reply from one of the clients in accordance with the data link layer protocol through the local area network back to said any one of the servers in the cluster wherein the data link layer protocol is an address resolution protocol for use by said any one of the servers for determining a local area network address of said one of the clients, and said one of the clients is specified by a network protocol address included in the server request, and said local area network address is included in the reply from said one of the clients.

2. The data processing system as claimed in claim 1, wherein the address resolution protocol is a protocol for sending to said one of the clients a new local area network address to be associated with the common network protocol address.

3. The data processing system as claimed in claim 1, wherein the address resolution protocol is a protocol for continuance of communication between said one of the network clients and the cluster of servers while the communication is switched between network ports of the cluster.

4. The data processing system as claimed in claim 1, wherein the local area network includes a switch for interconnecting the network clients to the servers and for distributing the client requests from network clients to the servers in order to balance loading of the client requests upon the servers.

5. The data processing system as claimed in claim 1, wherein each of the servers has a common local area network address that is shared among network ports of the servers and that is associated with the common network protocol address for receipt of the client requests distributed by the local area network from the network clients to the servers.

6. The data processing system as claimed in claim 5, wherein the common network protocol address for receipt of the client requests is also a common network protocol address of the servers for transmission of server requests to the clients.

7. The data processing system as claimed in claim 5, wherein the servers are interconnected and programmed for transmission of a client reply in accordance with the data address resolution protocol from any one of the servers to the other servers in the cluster when said any one of the servers receives the client reply in accordance with the address resolution protocol from the common local area network address.

8. The data processing system as claimed in claim 5, wherein each of the servers in the cluster has a respective local area network address that is not shared among the servers in the cluster and that is used for transmission of requests to and receipt of replies from network clients in accordance with the address resolution protocol.

9. The data processing system as claimed in claim 1, wherein each of the servers has a respective local area network address that is not shared among the servers in the cluster and that is associated with the common network protocol address for receipt of the client requests distributed by the local area network from the network clients to the servers.

10. The data processing system as claimed in claim 9, wherein each of the servers has a respective port having the respective local area network address that is not shared among the servers in the cluster, and said each of the servers has a respective driver for the respective port, the respective driver being programmed so that the respective local area network address that is not shared among the servers in the cluster is associated with the common network protocol address for receipt of the client requests distributed by the local area network from the network clients to the servers and is associated with a respective network protocol address that is not shared among the servers in the cluster for transmission of requests from said each of the servers to the clients in accordance with the address resolution protocol.

11. The data processing system as claimed in claim 9, wherein the address resolution protocol is a protocol for sending to said one of the clients a new local area network address to be associated with the common network protocol address.

12. The data processing system as claimed in claim 9, wherein the servers in the cluster are programmed so that when a client request directed to the common network protocol address is received by all of the servers in the cluster, only one of the servers in the cluster returns a reply to the client request.

13. The data processing system as claimed in claim 12, wherein the servers in the cluster are configured so that each server in the cluster returns replies to the client requests from a respective disjoint group of the clients associated with said each server.

14. The data processing system as claimed in claim 13, wherein the cluster of servers is programmed with a supervisory process for responding to failure of a failed server in the cluster by configuring at least one server in the cluster to return replies to the client requests from the respective disjoint group of the clients that had been associated with the failed server.

15. The data processing system as claimed in claim 1, wherein the common network protocol address is an Internet Protocol (IP) address, the servers are data mover computers of a network file server, and the address resolution protocol is the Address Resolution Protocol (ARP).

16. In a data processing system having a cluster of servers and a local area network interconnecting the servers to network clients for distributing client requests from the network clients to the servers, wherein the servers produce replies to the client requests, the local area network returns the replies to the client requests from the servers to the network clients, and the servers and the local area network are configured so that the servers share a common network protocol address for receipt of the client requests distributed by the local area network from the network clients to the servers, a method comprising:

transmitting a server request by one of the servers in the cluster to the clients in accordance with a data link layer protocol, and in response to the server request, transmitting a reply from one of the clients in accordance with the data link layer protocol through the local area network back to said one of the servers in the cluster, wherein the data link layer protocol is an address resolution protocol used by said any one of the servers for determining a local area network address of said one of the clients, and said one of the clients is specified by a network protocol address included in the server request, and said local area network address is included in the reply from said one of the clients.

17. The method as claimed in claim 16, which includes using the address resolution protocol for sending to said one of the clients a new local area network address to be associated with the common network protocol address.

18. The method as claimed in claim 16, which includes using the address resolution protocol for continuance of communication between said one of the network clients and the cluster of servers while the communication is switched between network ports of the cluster.

19. The method as claimed in claim 16, wherein the local area network includes a switch interconnecting the network clients to the servers, and the method includes the switch distributing the client requests from network clients to the servers in order to balance loading of the client requests upon the servers.

20. The method as claimed in claim 16, wherein each of the servers has a common local area network address that is shared among network ports of the servers and that is associated with the common network protocol address, and the method includes the local area network distributing the client requests from the network clients to the servers at the common local area network address.

21. The method as claimed in claim 20, which includes using the common network protocol address for transmission of server requests to the clients.

22. The method as claimed in claim 20, which includes a particular one of the servers in the cluster receiving a client reply from the common local area network address in accordance with the address resolution protocol, and in response said particular one of said servers transmitting the client reply to the other servers in the cluster.

23. The method as claimed in claim 20, wherein each of the servers in the cluster has a respective local area network address that is not shared among the servers in the cluster, and the method includes at least one of the servers in the cluster using its respective local area network address that is not shared among the servers in the cluster for transmission of a request to and receipt of a reply from at least one of the network clients in accordance with the address resolution protocol.

24. The method as claimed in claim 16, wherein each of the servers has a respective local area network address that is not shared among the servers in the cluster and that is associated with the common network protocol address, the method includes receiving, on the respective local area network addresses that are not shared among the servers in the cluster, the client requests that are distributed by the local area network from the network clients to the servers.

25. The method as claimed in claim 24, which includes using the address resolution protocol for sending to said one of the clients a new local area network address to be associated with the common network protocol address.

26. The method as claimed in claim 24, which includes only one of the servers in the cluster returning a reply to a client request when the client request is directed to the common network protocol address and is received by all of the servers in the cluster.

27. The method as claimed in claim 26, which includes each server in the cluster returning replies to the client requests from only a respective disjoint group of the clients associated with said each server.

28. The method as claimed in claim 27, which includes responding to failure of a failed server in the cluster by configuring at least one server in the cluster to return replies to the client requests from the respective disjoint group of the clients that had been associated with the failed server.

29. The method as claimed in claim 16, wherein the common network protocol address is an Internet Protocol (IP) address, the servers are data mover computers of a network file server, and the address resolution protocol is the Address Resolution Protocol (ARP).

* * * * *